(12) United States Patent
Kawasaki

(10) Patent No.: US 11,117,992 B2
(45) Date of Patent: Sep. 14, 2021

(54) FLUOROELASTOMER COMPOSITION AND MOLDED ARTICLE THEREOF

(71) Applicant: DAIKIN INDUSTRIES, LTD., Osaka (JP)

(72) Inventor: Kazuyoshi Kawasaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 23 days.

(21) Appl. No.: 16/261,868

(22) Filed: Jan. 30, 2019

(65) Prior Publication Data

US 2019/0248938 A1  Aug. 15, 2019

(30) Foreign Application Priority Data

Feb. 9, 2018  (JP) ............... JP2018-022134

(51) Int. Cl.
| | |
|---|---|
| *C08F 214/22* | (2006.01) |
| *C08K 3/22* | (2006.01) |
| *C08K 5/14* | (2006.01) |
| *C08J 3/24* | (2006.01) |
| *C08K 3/04* | (2006.01) |

(52) U.S. Cl.
CPC ............. *C08F 214/22* (2013.01); *C08J 3/24* (2013.01); *C08K 3/22* (2013.01); *C08K 5/14* (2013.01); *C08F 2800/10* (2013.01); *C08F 2810/20* (2013.01); *C08K 3/04* (2013.01)

(58) Field of Classification Search
CPC combination set(s) only.
See application file for complete search history.

(56) References Cited

U.S. PATENT DOCUMENTS

| | | | |
|---|---|---|---|
| 3,770,662 A | 11/1973 | Hennessy et al. | |
| 4,243,770 A | 1/1981 | Tatemoto et al. | |
| 4,910,260 A * | 3/1990 | Wachi | C08K 3/22 525/260 |
| 5,296,549 A | 3/1994 | Suyama et al. | |
| 5,650,472 A | 7/1997 | Tatemoto et al. | |
| 2002/0111417 A1 | 8/2002 | Kirochko et al. | |
| 2008/0262177 A1* | 10/2008 | Lyons | C08F 214/18 526/193 |
| 2013/0225758 A1* | 8/2013 | Yano | B29D 22/02 524/546 |

FOREIGN PATENT DOCUMENTS

| | | | |
|---|---|---|---|
| CN | 102924732 A | 2/2013 | |
| FR | 2 249 118 A1 | 5/1975 | |
| JP | 50-74644 A | 6/1975 | |
| JP | S53-125491 A | 11/1978 | |
| JP | 4-296339 A | 10/1992 | |
| JP | 7-179704 A | 7/1995 | |
| JP | 2012-530804 A | 12/2012 | |
| WO | 94/24175 A1 | 10/1994 | |
| WO | WO-2009086068 A2 * | 7/2009 | ........... C08K 5/0025 |
| WO | 2010/147815 A2 | 12/2010 | |
| WO | 2015/173194 A1 | 11/2015 | |

OTHER PUBLICATIONS

The Extended European Search Report dated Jul. 3, 2019, issued by the European Patent Office in counterpart European Application No. 19154442.8.
Database WPI, Week 201377, Thomson Scientific, London, GB; AN 2013-H83588, XP-002792336, Feb. 13, 2013 (2 pages total).

* cited by examiner

*Primary Examiner* — Nicole M. Buie-Hatcher
(74) *Attorney, Agent, or Firm* — Sughrue Mion, PLLC

(57) ABSTRACT

The invention provides a fluoroelastomer composition capable of providing a molded article that is inexpensive and has excellent heat-aging resistance. The fluoroelastomer composition is a peroxide-crosslinkable fluoroelastomer composition containing a fluorine-containing elastomer that contains 25 to 90 mol % of a unit of vinylidene fluoride, 10 to 75 mol % of a unit of a fluorine-containing monomer other than the vinylidene fluoride, 0 to 10 mol % of a unit of a fluorine-free monomer copolymerizable with the vinylidene fluoride, and 0.1% by mass or less of an iodine atom and a bromine atom; an organic peroxide having a specific structure; and a co-crosslinking agent. The organic peroxide is present in an amount of 0.3 to 10 parts by mass relative to 100 parts by mass of the fluorine-containing elastomer.

8 Claims, No Drawings

FLUOROELASTOMER COMPOSITION AND MOLDED ARTICLE THEREOF

TECHNICAL FIELD

The invention relates to fluoroelastomer compositions and molded articles thereof.

BACKGROUND ART

Fluoroelastomers are excellent in a variety of properties such as heat resistance, oil resistance, and chemical resistance, and are therefore used in a variety of applications.

Patent Literature documents 1 to 3 disclose fluoroelastomer compositions containing an organic peroxide having a specific structure, such as 2,5-dimethyl-2,5-di(t-butylperoxy)hexane, benzoyl peroxide, or tert-butyl peroxybenzoate.

CITATION LIST

Patent Literature

Patent Literature 1: JP S53-125491 A
Patent Literature 2: JP 2012-530804 T
Patent Literature 3: WO 94/24175

SUMMARY OF INVENTION

Technical Problem

Fluoroelastomers still need to be improved in terms of heat-aging resistance and cost.

The invention aims to provide a fluoroelastomer composition capable of providing a molded article that is inexpensive and has excellent heat-aging resistance.

Solution to Problem

The invention relates to a peroxide-crosslinkable fluoroelastomer composition containing: a fluorine-containing elastomer that contains 25 to 90 mol % of a unit of vinylidene fluoride, 10 to 75 mol % of a unit of a fluorine-containing monomer other than the vinylidene fluoride, 0 to 10 mol % of a unit of a fluorine-free monomer copolymerizable with the vinylidene fluoride, and 0.1% by mass or less of an iodine atom and a bromine atom; an organic peroxide having a structure represented by the following formula (1):

[Chem. 1]

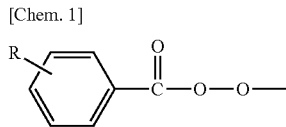

wherein R is H or a C1-C4 alkyl group; and a co-crosslinking agent, the organic peroxide being present in an amount of 0.3 to 10 parts by mass relative to 100 parts by mass of the fluorine-containing elastomer.

The fluorine-containing elastomer preferably has a Mooney viscosity ML1+10 of 65 or higher at 121° C.

Preferably, the fluorine-containing elastomer contains vinylidene fluoride, hexafluoropropylene, and a different fluorine-containing monomer, and a unit of the vinylidene fluoride, a unit of the hexafluoropropylene, and a unit of the different fluorine-containing monomer give a mole ratio (vinylidene fluoride unit/hexafluoropropylene unit/different fluorine-containing monomer unit) of (25 to 90)/(10 to 40)/(0 to 50).

Preferably, the fluorine-containing elastomer consists only of vinylidene fluoride and hexafluoropropylene, and a unit of the vinylidene fluoride and a unit of the hexafluoropropylene give a mole ratio (vinylidene fluoride unit/hexafluoropropylene unit) of (25 to 90)/(75 to 10).

The fluorine-containing elastomer preferably has a glass transition temperature of 25° C. or lower.

In the fluoroelastomer composition of the invention, the co-crosslinking agent is preferably present in an amount of 0.3 to 10 parts by mass relative to 100 parts by mass of the fluorine-containing elastomer.

The organic peroxide is preferably t-butyl peroxybenzoate or 2,5-dimethyl-2,5-di(benzoylperoxy)hexane.

In the fluoroelastomer composition of the invention, a metal oxide and a metal hydroxide are preferably present in an amount of 0 to 10.0 parts by mass relative to 100 parts by mass of the fluorine-containing elastomer.

The invention also relates to a molded article obtainable by crosslinking the aforementioned fluoroelastomer composition.

Advantageous Effects of Invention

The fluoroelastomer composition of the invention contains a specific fluorine-containing elastomer and a specific organic peroxide, and can therefore be crosslinked even when the fluorine-containing elastomer has no crosslinking site. Accordingly, the fluoroelastomer composition of the invention can provide a molded article that is inexpensive and has excellent heat-aging resistance.

DESCRIPTION OF EMBODIMENTS

The invention relates to a peroxide-crosslinkable fluoroelastomer composition containing: a fluorine-containing elastomer that contains 25 to 90 mol % of a unit of vinylidene fluoride (VdF), 10 to 75 mol % of a unit of a fluorine-containing monomer other than VdF, 0 to 10 mol % of a unit of a fluorine-free monomer copolymerizable with VdF, and 0.1% by mass or less of an iodine atom and a bromine atom; an organic peroxide having a structure represented by the following formula (1):

[Chem. 2]

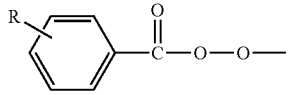

(wherein R is H or a C1-C4 alkyl group); and a co-crosslinking agent, the organic peroxide being present in an amount of 0.3 to 10 parts by mass relative to 100 parts by mass of the fluorine-containing elastomer.

In usual peroxide crosslinking of a fluorine-containing elastomer, the crosslinking is performed with the use of an iodine atom, a bromine atom, a chlorine atom, a CN group, and a carbon-carbon unsaturated bond in the main chain or a side chain of the fluorine-containing elastomer. In contrast, a fluorine-containing elastomer containing specific amounts of a unit of vinylidene fluoride (VdF) and a unit of a fluorine-containing monomer other than VdF, when used together with a specific organic peroxide, enables the crosslinking without any of an iodine atom, a bromine atom, a chlorine atom, a CN group, and a carbon-carbon unsaturated bond in the main chain or a side chain, each of which serves as a crosslinking site. This also enables the crosslinking without a metal oxide, a metal hydroxide, or an onium salt in the composition. This also eliminates the need for addition of a plurality of organic peroxides in the composition. Addition of a single organic peroxide alone enables the crosslinking.

The fluorine-containing elastomer contains 25 to 90 mol % of a unit of VdF, 10 to 75 mol % of a unit of a fluorine-containing monomer other than VdF, and 0 to 10 mol % of a unit of a fluorine-free monomer copolymerizable with VdF. In the fluorine-containing elastomer, the proportion of the VdF unit is preferably 45 to 85 mol %, more preferably 70 to 85 mol %, particularly preferably 75 to 82 mol %.

In the fluorine-containing elastomer, the proportion of the unit of a fluorine-containing monomer other than VdF is preferably 15 to 55 mol %, more preferably 15 to 30 mol %, particularly preferably 18 to 25 mol %.

In the fluorine-containing elastomer, the proportion of the unit of a fluorine-free monomer copolymerizable with VdF is preferably 10 mol % or less, more preferably 5 mol % or less, still more preferably 1 mol % or less. Particularly preferably, this unit is absent. More than 10 mol % of the unit of a fluorine-free monomer tends to cause poor fuel oil resistance of a molded article after crosslinking.

The fluorine-containing elastomer preferably has a glass transition temperature of 25° C. or lower, more preferably 5° C. or lower, still more preferably −10° C. or lower, particularly preferably −15° C. or lower. The glass transition temperature may be determined as follows. Specifically, using a differential scanning calorimeter (DSC822e, Mettler-Toledo International Inc.), 10 mg of a sample (fluorine-containing elastomer) is cooled down to −75° C. and then heated at a rate of 10° C./min to give a DSC curve. Next, the temperature is read at the intermediate point of two intersections between each of the extension lines of the base lines before and after the secondary transition of the DSC curve and the tangent line at the inflection point of the DSC curve.

The fluorine-containing monomer other than VdF may be any monomer copolymerizable with VdF, and examples thereof include tetrafluoroethylene (TFE), hexafluoropropylene (HFP), perfluoroalkyl vinyl ether (PAVE), trifluoroethylene, trifluoropropylene, tetrafluoropropylene, pentafluoropropylene, trifluorobutene, tetrafluoroisobutene, hexafluoroisobutene, vinyl fluoride, and fluorine-containing monomers represented by the following formula (2):

$$CH_2=CFRf \qquad (2)$$

(wherein Rf is a C1-C12 linear or branched fluoroalkyl group). One of these monomers and compounds may be used alone, or two or more of these may be used in combination.

The PAVE is more preferably perfluoro(methyl vinyl ether) (PMVE) or perfluoro(propyl vinyl ether) (PPVE), particularly preferably PMVE.

The PAVE used may also be perfluorovinyl ether represented by the formula:

$$CF_2=CFOCF_2ORf^c$$

(wherein $Rf^c$ is a C1-C6 linear or branched perfluoroalkyl group, a C5-C6 cyclic perfluoroalkyl group, or a C2-C6 linear or branched perfluorooxyalkyl group containing 1 to 3 oxygen atoms). For example, $CF_2=CFOCF_2OCF_3$,  or $CF_2=CFOCF_2OCF_2CF_2OCF_3$ is preferred.

The fluorine-containing monomer represented by the formula (2) is preferably a monomer wherein Rf is a linear fluoroalkyl group, more preferably a monomer wherein Rf is a linear perfluoroalkyl group. The number of carbon atoms in Rf is preferably 1 to 6.

Examples of the fluorine-containing monomer represented by the formula (2) include $CH_2=CFCF_3$, $CH_2=CFCF_2CF_3$, $CH_2=CFCF_2CF_2CF_3$, and $CH_2=CFCF_2CF_2CF_2CF_3$. Preferred among these is 2,3,3,3-tetrafluoropropylene represented by $CH_2=CFCF_3$.

Preferred examples of the fluorine-free monomer copolymerizable with VdF include, but not limited to, ethylene (Et), propylene (Pr), and reactive emulsifiers.

The fluorine-containing elastomer is preferably at least one copolymer selected from the group consisting of VdF/HFP copolymers, VdF/TFE/HFP copolymers, VdF/PAVE copolymers, VdF/TFE/PAVE copolymers, VdF/HFP/PAVE copolymers, VdF/HFP/TFE/PAVE copolymers, VdF/TFE/Pr copolymers, VdF/Et/HFP copolymers, and copolymers of VdF and a fluorine-containing monomer represented by the formula (2). The fluorine-containing elastomer is more preferably a copolymer containing at least one comonomer selected from the group consisting of TFE, HFP, a fluorine-containing monomer represented by the formula (2), and PAVE as a monomer (comonomer) to be used in copolymerization other than VdF.

Preferred among these is at least one copolymer selected from the group consisting of VdF/HFP copolymers, VdF/TFE/HFP copolymers, copolymers of VdF and a fluorine-containing monomer represented by the formula (2), VdF/PAVE copolymers, VdF/TFE/PAVE copolymers, VdF/HFP/PAVE copolymers, and VdF/HFP/TFE/PAVE copolymers, more preferred is at least one copolymer selected from the group consisting of VdF/HFP copolymers, VdF/HFP/TFE copolymers, copolymers of VdF and a fluorine-containing monomer represented by the formula (2), and VdF/PAVE copolymers, particularly preferred is at least one copolymer selected from the group consisting of VdF/HFP copolymers, copolymers of VdF and a fluorine-containing monomer represented by the formula (2), and VdF/PAVE copolymers.

Preferably, the fluorine-containing elastomer contains VdF, HFP, and a different fluorine-containing monomer, and a unit of VdF, a unit of HFP, and a unit of the different fluorine-containing monomer give a mole ratio (VdF unit/HFP unit/different fluorine-containing monomer unit) of (25 to 90)/(10 to 40)/(0 to 50), more preferably (45 to 85)/(10 to 35)/(0 to 30). The different fluorine-containing monomer is preferably a fluorine-containing monomer mentioned as an example of the comonomer for VdF, such as TFE, PMVE, perfluoroethyl vinyl ether (PEVE), PPVE, trifluoroethylene, hexafluoroisobutene, vinyl fluoride, or a fluorine-containing monomer represented by the formula (2), more preferably TFE, PMVE, or a fluorine-containing monomer represented by the formula (2).

Also preferably, the fluorine-containing elastomer is a VdF/HFP copolymer consisting only of VdF and HFP, and a unit of VdF and a unit of HFP give a mole ratio (VdF unit/HFP unit) of (25 to 90)/(75 to 10), more preferably (45 to 85)/(55 to 15), still more preferably (70 to 85)/(30 to 15), further more preferably (75 to 82)/(25 to 18).

The VdF/TFE/HFP copolymer preferably has a mole ratio (VdF unit/TFE unit/HFP unit) of (30 to 80)/(4 to 35)/(10 to 35).

The VdF/PAVE copolymer preferably has a mole ratio (VdF unit/PAVE unit) of (65 to 90)/(35 to 10).

In a preferred embodiment, the mole ratio (VdF unit/PAVE unit) is (50 to 78)/(50 to 22).

The VdF/TFE/PAVE copolymer preferably has a mole ratio (VdF unit/TFE unit/PAVE unit) of (40 to 80)/(3 to 40)/(15 to 35).

The VdF/HFP/PAVE copolymer preferably has a mole ratio (VdF unit/HFP unit/PAVE unit) of (65 to 90)/(3 to 25)/(3 to 25).

The VdF/HFP/TFE/PAVE copolymer preferably has a mole ratio (VdF unit/HFP unit/TFE unit/PAVE unit) of (40 to 90)/(0 to 25)/(0 to 40)/(3 to 35), more preferably (40 to 80)/(3 to 25)/(3 to 40)/(3 to 25).

Preferably, the copolymer of VdF and a fluorine-containing monomer (2) represented by the formula (2) has a mole ratio (VdF unit/fluorine-containing monomer (2) unit) of (25 to 85)/(75 to 15) and satisfies that the sum of the proportions of the units of the monomers other than VdF and the fluorine-containing monomer (2) is 0 to 50 mol % of all the monomer units, more preferably has a mole ratio (VdF unit/fluorine-containing monomer (2) unit) of (25 to 80)/(75 to 20). In a preferred embodiment, the mole ratio (VdF unit/fluorine-containing monomer (2) unit) is (50 to 78)/(50 to 22).

Also preferably, the mole ratio (VdF unit/fluorine-containing monomer (2) unit) is (50 to 85)/(50 to 15) and the sum of the proportions of the units of the monomers other than VdF and the fluorine-containing monomer (2) is 1 to 50 mol % of all the monomer units. Preferred examples of the monomers other than VdF and the fluorine-containing monomer (2) include monomers mentioned as examples of comonomers for VdF, such as TFE, HFP, PMVE, PEVE, PPVE, trifluoroethylene, hexafluoroisobutene, vinyl fluoride, Et, Pr, alkyl vinyl ether, and reactive emulsifiers. More preferred are PMVE, HFP, and TFE.

In order to more effectively improve the reinforcibility of the fluoroelastomer composition of the invention and the durability at high temperature of a molded article obtainable from the fluoroelastomer composition, the fluorine-containing elastomer is preferably a binary copolymer consisting only of a VdF unit and a HFP unit, a polymerized unit based on a fluorine-containing monomer represented by the formula (2), or a PAVE unit. In other words, the fluorine-containing elastomer is preferably at least one binary copolymer selected from the group consisting of VdF/HFP copolymers, copolymers of VdF and a fluorine-containing monomer represented by the formula (2), and VdF/PAVE copolymers.

The fluorine-containing copolymer is more preferably at least one binary copolymer selected from the group consisting of VdF/HFP copolymers, VdF/2,3,3,3-tetrafluoropropylene copolymers, and VdF/PAVE copolymers, particularly preferably at least one binary copolymer selected from the group consisting of VdF/HFP copolymers and VdF/2,3,3,3-tetrafluoropropylene copolymers.

In order to give better tensile properties at high temperature to a molded article obtainable from the fluoroelastomer composition of the invention, the fluorine-containing elastomer may be a copolymer that contains a VdF unit and a structural unit (hereinafter, referred to as a "structural unit (a)") derived from at least one selected from the group consisting of HFP, 2,3,3,3-tetrafluoropropylene, and PAVE and has a mole ratio (VdF unit/structural unit (a)) of (50 to 90)/(50 to 10). The mole ratio (VdF unit/structural unit (a)) is preferably (52 to 85)/(48 to 15), more preferably (25 to 55)/(75 to 45).

In addition to the VdF unit and the structural unit (a), the fluorine-containing elastomer may contain a structural unit derived from a monomer other than the VdF unit and the structural unit (a), and the amount thereof is preferably 0 to 40 mol %, more preferably 0 to 30 mol %, still more preferably 0 to 20 mol %, particularly preferably 0 to 10 mol %, relative to 100 mol % of all the structural units.

The copolymer may contain a structural unit derived from a different monomer. Still, the copolymer is preferably a binary copolymer containing no structural unit derived from a different monomer, and is preferably at least one binary copolymer selected from the group consisting of VdF/HFP copolymers, VdF/2,3,3,3-tetrafluoropropylene copolymers, and VdF/PAVE copolymers, more preferably at least one binary copolymer selected from the group consisting of VdF/HFP copolymers and VdF/2,3,3,3-tetrafluoropropylene copolymers.

The fluorine-containing elastomer contains 0.1% by mass or less, preferably 0.01% by mass or less, more preferably 0.001% by mass or less, still more preferably 0.0005% by mass or less of an iodine atom and a bromine atom. Particularly preferably, the fluorine-containing elastomer contains neither an iodine atom nor a bromine atom. The aforementioned amount of an iodine atom and a bromine atom refers to the sum of the amount of an iodine atom and the amount of a bromine atom. The fluorine-containing elastomer preferably contains 0.1% by mass or less, more preferably 0.05% by mass or less, still more preferably 0.01% by mass or less, particularly preferably 0.005% by mass or less of a chlorine atom.

The amount of iodine or bromine in the fluorine-containing elastomer may be determined by quantitative analysis. Specifically, a sample (fluorine-containing elastomer) is combusted to generate a gas. This gas is made to be absorbed by a collection liquid, and the liquid is subjected to X-ray fluorescence analysis. The iodine content can also be determined as follows. Specifically, 12 mg of a sample (fluorine-containing elastomer) is mixed with 5 mg of $Na_2SO_3$. Separately, 30 mg of a mixture of $Na_2CO_3$ and $K_2CO_3$ (mass ratio=1:1) is dissolved in 20 ml of pure water to prepare an absorption liquid. With this absorption liquid, the sample mixture is burnt in the presence of oxygen in a quartz combustion flask. The product is left for 30 minutes, and then analyzed using an ion chromatograph 20A (Shimadzu Corp.).

Examples of a crosslinkable functional group for peroxide crosslinking include carbon-carbon unsaturated bond (excluding those having aromaticity) derived from a bisolefin compound and a CN group. The amount of a bisolefin compound monomer unit in the fluorine-containing elastomer is preferably 0.1 mol % or less, more preferably 0.01 mol % or less, still more preferably 0.005 mol % or less, of all the monomer units constituting the fluorine-containing elastomer. Particularly preferably, the fluorine-containing elastomer contains no bisolefin compound monomer unit.

Further, the amount of a monomer unit containing a CN group in the fluorine-containing elastomer is preferably 0.1 mol % or less, more preferably 0.01 mol % or less, still more preferably 0.005 mol % or less, of all the monomer units constituting the fluorine-containing elastomer. Particularly preferably, the fluorine-containing elastomer contains no monomer unit containing a CN group.

The fluorine-containing elastomer needs not to contain these crosslinkable functional groups, and thus has excellent heat-aging resistance. The fluorine-containing elastomer also has excellent fuel oil resistance and acid resistance. The fluorine-containing elastomer neither needs to contain an expensive iodine-containing monomer unit, a bromine-containing monomer unit, a chlorine-containing monomer unit, a CN group-containing monomer unit, or a bisolefin compound monomer unit, nor needs to use an expensive chain transfer agent such as an iodine or bromine compound in production of the fluorine-containing elastomer, nor needs to perform complicated treatment to generate a carbon-carbon unsaturated bond. This can reduce the price of the fluorine-containing elastomer.

Examples of the iodine-containing monomer, bromine-containing monomer, chlorine-containing monomer, and CN group-containing monomer include chlorotrifluoroethylene (CTFE) and compounds represented by the following formula (3):

$$CY^1{}_2=CY^2R_f{}^2X^1 \quad (3)$$

(wherein $Y^1$ and $Y^2$ are each a fluorine atom, a hydrogen atom, or —$CH_3$; $R_f{}^2$ is a linear or branched fluorine-containing alkylene group which optionally contains one or more ether bond oxygen atoms, optionally contains an aromatic ring, and in which any or all of the hydrogen atoms are replaced by fluorine atoms; and $X^1$ is an iodine atom, a bromine atom, a chlorine atom, or a CN group). Specific examples thereof include iodine-containing monomers, bromine-containing monomers, chlorine-containing monomers, and CN group-containing monomers represented by the following formula (4):

$$CY^1{}_2=CY^2R_f{}^3CHR^1-X^1 \quad (4)$$

(wherein $Y^1$, $Y^2$, and $X^1$ are defined in the same manner as mentioned above; $R_f{}^3$ is a linear or branched fluorine-containing alkylene group which optionally contains one or more ether bond oxygen atoms and in which any or all of the hydrogen atoms are replaced by fluorine atoms, i.e., a linear or branched fluorine-containing alkylene group in which any or all of the hydrogen atoms are replaced by fluorine atoms, a linear or branched fluorine-containing oxyalkylene group in which any or all of the hydrogen atoms are replaced by fluorine atoms, or a linear or branched fluorine-containing polyoxyalkylene group in which any or all of the hydrogen atoms are replaced by fluorine atoms; and $R^1$ is a hydrogen atom or a methyl group) and iodine-containing monomers, bromine-containing monomers, chlorine-containing monomers, and CN group-containing monomers represented by any of the following formulae (5) to (22):

$$CY^4{}_2=CY^4(CF_2)_n-X \quad (5)$$

(wherein $Y^4$s are the same as or different from each other, and are each a hydrogen atom or a fluorine atom; and n is an integer of 1 to 8);

$$CF_2=CFCF_2R_f{}^4-X^1 \quad (6)$$

(wherein $Rf^4$ is $-(OCF_2)_n-$ or $-(OCF(CF_3))_n-$ [Chem. 3]

and n is an integer of 0 to 5);

$$CF_2=CFCF_2(OCF(CF_3)CF_2)_m(OCH_2CF_2CF_2)_nOCH_2CF_2-X^1 \quad (7)$$

(wherein m is an integer of 0 to 5; and n is an integer of 0 to 5);

$$CF_2=CFCF_2(OCH_2CF_2CF_2)_m(OCF(CF_3)CF_2)_nOCF(CF_3)-X^1 \quad (8)$$

(wherein m is an integer of 0 to 5; and n is an integer of 0 to 5);

$$CF_2=CF(OCF_2CF(CF_3))_mO(CF_2)_n-X^1 \quad (9)$$

(wherein m is an integer of 0 to 5; and n is an integer of 1 to 8);

$$CF_2=CF(OCF_2CF(CF_3))_m-X^1 \quad (10)$$

(wherein m is an integer of 1 to 5);

$$CF_2=CFOCF_2(CF(CF_3)OCF_2)_nCF(-X^1)CF_3 \quad (11)$$

(wherein n is an integer of 1 to 4);

$$CF_2=CFO(CF_2)_nOCF(CF_3)-X^1 \quad (12)$$

(wherein n is an integer of 2 to 5);

$$CF_2=CFO(CF_2)_n-(C_6H_4)-X^1 \quad (13)$$

(wherein n is an integer of 1 to 6);

$$CF_2=CF(OCF_2CF(CF_3))_nOCF_2CF(CF_3)-X^1 \quad (14)$$

(wherein n is an integer of 1 or 2);

$$CH_2=CFCF_2O(CF(CF_3)CF_2O)_nCF(CF_3)-X^1 \quad (15)$$

(wherein n is an integer of 0 to 5);

$$CF_2=CFO(CF_2CF(CF_3)O)_m(CF_2)_n-X^1 \quad (16)$$

(wherein m is an integer of 0 to 5; and n is an integer of 1 to 3);

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

(wherein m is an integer of 0 or greater);

$$CF_2=CFOCF(CF_3)CF_2O(CF_2)_n-X^1 \quad (20)$$

(wherein n is an integer of 1 or greater);

$$CF_2=CFOCF_2OCF_2CF(CF_3)OCF_2-X \quad (21)$$

$$CH_2=CH-(CF_2)_nX^1 \quad (22)$$

(wherein n is an integer of 2 to 8).

In the formulae (5) to (22), $X^1$ is defined in the same manner as mentioned above.

Examples of the iodine-containing monomers, bromine-containing monomers, chlorine-containing monomers, and CN group-containing monomers represented by the formula (4) include iodine-containing fluorinated vinyl ethers represented by the following formula (23):

[Chem. 4]

$$I(CH_2CF_2CF_2O)_m(\overset{CF_3}{\underset{|}{C}}FCF_2O)_nCF=CF_2 \quad (23)$$

(wherein m is an integer of 1 to 5; and n is an integer of 0 to 3). More specifically, those represented by the following formulae:

[Chem. 5]

$ICH_2CF_2CF_2OCF=CF_2$, $I(CH_2CF_2CF_2O)_2CF=CF_2$, $I(CH_2CF_2CF_2O)_3CF=CF_2$, $ICH_2CF_2CF_2O\overset{CF_3}{\underset{|}{C}}FCF_2OCF=CF_2$, $ICH_2CF_2CF_2O(\overset{CF_3}{\underset{|}{C}}FCF_2O)_3CF=CF_2$ may be mentioned.

More specific examples of the iodine-containing monomers and bromine-containing monomers represented by the formula (5) include $ICF_2CF_2CF=CH_2$ and $I(CF_2CF_2)_2CF=CH_2$.

A more specific example of the iodine-containing monomers and bromine-containing monomers represented by the formula (9) is $I(CF_2CF_2)_2OCF=CF_2$.

More specific examples of the iodine-containing monomers and bromine-containing monomers represented by the formula (22) include $CH_2=CHCF_2CF_2I$ and $I(CF_2CF_2)_2CH=CH_2$.

Examples of the bisolefin compound monomer include monomers represented by the following formula:

$$CR^2R^3=CR^4-Z-CR^5=CR^6R^7$$

wherein $R^2$, $R^3$, $R^4$, $R^5$, $R^6$, and $R^7$ are the same as or different from each other, and are each a hydrogen atom, a fluorine atom, or a C1-C5 alkyl group; Z is a C1-C18 alkylene group, a C3-C18 cycloalkylene group, at least partially fluorinated C1-C10 alkylene or oxyalkylene group, or a (per)fluoropolyoxyalkylene group having a molecular weight of 500 to 10000 and represented by the following formula:

$$-(Q)_p-CF_2O-(CF_2CF_2O)_m(CF_2O)_n-CF_2-(Q)_p-$$

(wherein Q is an alkylene or oxyalkylene group; p is 0 or 1; and m/n is 0.2 to 5), each of which is linear or branched and optionally contains an oxygen atom.

Examples of the compound monomer represented by the formula:

$$CR^2R^3=CR^4-Z-CR^5=CR^6R^7$$

include $CH_2=CH-(CF_2)_2-CH=CH_2$, $CH_2=CH-(CF_2)_4-CH=CH_2$, $CH_2=CH-(CF_2)_6-CH=CH_2$, and monomers represented by the following formula:

$$CH_2=CH-Z^1-CH=CH_2$$

wherein $Z^1$ is a fluoropolyoxyalkylene group having a molecular weight of 2000 and represented by $-CH_2OCH_2-CF_2O-(CF_2CF_2O)_{m1}(CF_2O)_{n1}-CF_2-CH_2OCH_2-$ (wherein m1/n1 is 0.5).

Examples of the chain-transfer agent include compounds represented by the following formula:

$$R^2I_xBr_y$$

wherein x and y are each an integer of 0 to 2 and satisfy $1 \leq x+y \leq 2$; and $R^2$ is a C1-C16 saturated or unsaturated fluorohydrocarbon or chlorofluorohydrocarbon group, or a C1-C3 hydrocarbon group, each of which optionally contains an oxygen atom.

Examples of the iodine compound include 1,3-diiodoperfluoropropane, 2-iodoperfluoroproparie, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFCLBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, and monoiodo- and monobromo-substitution products, diiodo- and monobromo-substitution products, and (2-iodoethyl)- and (2-bromoethyl)-substitution products of benzene.

In order to achieve good moldability, the fluorine-containing elastomer preferably has a Mooney viscosity ML1+10 of 65 or higher, more preferably 70 or higher, still more preferably 80 or higher, particularly preferably 90 or higher, at 121° C. The Mooney viscosity ML1+10 is preferably 160 or lower, more preferably 140 or lower. The Mooney viscosity ML1+10 at 121° C. is determined in conformity with ASTM D1646-15 and JIS K6300-1:2013. The fluorine-containing elastomer having a Mooney viscosity ML1+10 of lower than 65 tends to have a low crosslinking density, causing a failure in molding thereof. The fluorine-containing elastomer having a Mooney viscosity ML1+10 of higher than 160 tends to have excessively poor processability.

The fluorine-containing elastomer as described hereinabove may be produced by a common method such as emulsion polymerization, suspension polymerization, or solution polymerization. In polymerization production of the fluorine-containing elastomer, a chain transfer agent may be used. Examples of the chain transfer agent include esters such as dimethyl malonate, diethyl malonate, methyl acetate, ethyl acetate, butyl acetate, and dimethyl succinate, isopentane, methane, ethane, propane, 2-propanol, acetone, a variety of mercaptans, carbon tetrachloride, and cyclohexane. The fluorine-containing elastomer may be produced without a polymerization technique known as iodine (bromine) transfer polymerization using an iodine (bromine) compound.

The fluoroelastomer composition of the invention contains an organic peroxide having a structure represented by the following formula (1):

[Chem. 6]

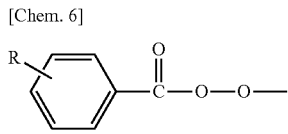

wherein R is H or a C1-C4 alkyl group.

The fluoroelastomer composition of the invention contains the above organic peroxide, and thus can be crosslinked despite the absence of a crosslinking site in the fluorine-containing elastomer.

R is preferably H or a methyl group.

Examples of the organic peroxide include benzoyl peroxide, t-butyl peroxybenzoate, di(3-methylbenzoyl)peroxide, benzoyl(3-methylbenzoyl)peroxide, di(4-methylbenzoyl)peroxide, 2,5-dimethyl-2,5-di(3-methylbenzoylperoxy)hexane, 2,5-dimethyl-2,5-di(benzoylperoxy)hexane, t-butylperoxy-3-methyl benzoate, and t-butyl peroxybenzoate. In order to achieve good physical properties of a molded article after crosslinking, preferred is t-butyl peroxybenzoate or 2,5-dimethyl-2,5-di(benzoylperoxy)hexane, more preferred is t-butyl peroxybenzoate.

The organic peroxide is present in an amount of 0.3 to 10 parts by mass relative to 100 parts by mass of the fluorine-containing elastomer. The amount of the organic peroxide is preferably 0.5 to 6.0 parts by mass, more preferably 0.7 to 5.0 parts by mass, still more preferably 0.8 to 2.5 parts by mass, relative to 100 parts by mass of the fluorine-containing elastomer. Less than 0.3 parts by mass of the organic peroxide tends to hinder sufficient progress of crosslinking of the fluorine-containing elastomer. More than 10 parts by mass thereof tends to cause an increase in the amount of gas generated during crosslinking which may results in molding failure and to cause a reduced balance of the physical properties after crosslinking. The organic peroxide may be impregnated into inert inorganic powder before it is mixed into the fluoroelastomer composition.

Multiple organic peroxides may be used in combination. Still, in order to achieve good physical properties of a molded article after crosslinking, adding a single organic peroxide is preferred.

The fluoroelastomer composition of the invention contains a co-crosslinking agent.

Examples of the co-crosslinking agent include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallyl phosphoramide, N,N,N',N'-tetraallyl phthalamide, N,N,N',N'-tetraallyl malonamide, trivinyl isocyanurate, 2,4,6-trivinyl methyl trisiloxane, tri(5-norbornene-2-methylene)cyanurate, and triallyl phosphite. In order to achieve good crosslinkability and good physical properties of a molded article, triallyl isocyanurate (TAIC) is preferred.

The co-crosslinking agent may also be a low self-polymerizable crosslinking accelerator. The low self-polymerizable crosslinking accelerator is a compound having low self-polymerizability, unlike triallyl isocyanurate (TAIC) which is well known as a co-crosslinking agent.

Examples of the low self-polymerizable crosslinking accelerator include:
trimetallyl isocyanurate (TMAIC) represented by the following formula:

[Chem. 7]

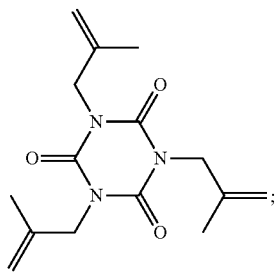

p-quinonedioxime represented by the following formula:

[Chem. 8]

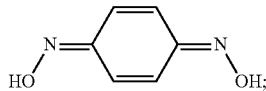

p,p'-dibenzoylquinonedioxime represented by the following formula:

[Chem. 9]

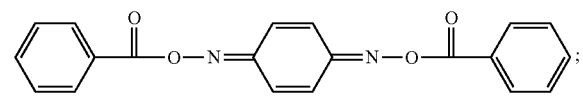

maleimide represented by the following formula:

[Chem. 10]

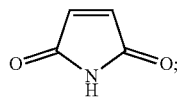

N-phenylene maleimide represented by the following formula:

[Chem. 11]

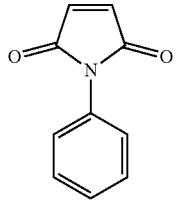

and N,N'-phenylene bismaleimide represented by the following formula:

[Chem. 12]

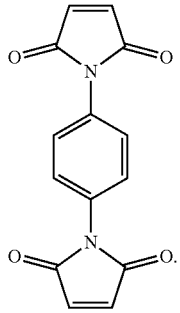

The low self-polymerizable crosslinking accelerator is preferably trimetallyl isocyanurate (TMAIC).

The co-crosslinking agent used may also be a bisolefin.

Examples of the bisolefin to be used as a co-crosslinking agent include bisolefins represented by the following formula:

$R^2R^3C=CR^4-Z-CR^5=CR^6R^7$ wherein $R^2$, $R^3$, $R^4$, $R^5$, $R^6$, and $R^7$ are the same as or different from each other, and are each H or a C1-C5 alkyl group; and Z is a C1-C18 at least partially fluorinated alkylene or cycloalkylene group or a (per)fluoropolyoxyalkylene group, each of which is linear (straight-chain) or branched and optionally contains an oxygen atom.

Z is preferably a C4-C12 perfluoroalkylene group, and $R^2$, $R^3$, $R^4$, $R^5$, $R^6$, and $R^7$ are each preferably a hydrogen atom.

With Z being a (per)fluoropolyoxyalkylene group, preferred is a (per)fluoropolyoxyalkylene group represented by the following formula:

$-(Q)_p-CF_2O-(CF_2CF_2O)_m-(CF_2O)_n-CF_2-(Q)_p-$ (wherein Q is a C1-C10 alkylene or oxyalkylene group; p is 0 or 1; and m and n are integers that give an m/n ratio of 0.2 to 5 and allow the (per)fluoropolyoxyalkylene group to have a molecular weight of 500 to 10000, preferably 1000 to 4000). In this formula, Q is preferably selected from —$CH_2OCH_2$— and —$CH_2O(CH_2CH_2O)_sCH_2$— (wherein s=1 to 3).

Preferred examples of the bisolefin include $CH_2$=CH—$(CF_2)_4$—CH=$CH_2$, $CH_2$=CH—$(CF_2)_6$—CH=$CH_2$, and $CH_2$—CH—$Z^1$—CH=$CH_2$ (wherein $Z^1$ is —$CH_2OCH_2$—$CF_2O$—$(CF_2CF_2O)_5$— $(CF_2O)$—$CF_2$—$CH_2OCH_2$—, where m/n is 0.5).

Preferred is 3,3,4,4,5,5,6,6,7,7,8,8-dodecafluoro-1,9-decadiene represented by $CH_2$=CH—$(CF_2)_6$—CH=$CH_2$.

The amount of the co-crosslinking agent is preferably 0.3 to 10 parts by mass, more preferably 0.5 to 10 parts by mass, still more preferably 1.0 to 6.0 parts by mass, further more preferably 1.5 to 6.0 parts by mass, particularly preferably 2.0 to 5.0 parts by mass, relative to 100 parts by mass of the fluorine-containing elastomer. Less than 0.3 parts by mass of the co-crosslinking agent tends to cause undercure. More than 1.0 parts by mass thereof tends to cause a reduced balance of the physical properties after crosslinking. The co-crosslinking agent may be impregnated into inert inorganic powder before it is mixed into the fluoroelastomer composition.

The fluoroelastomer composition of the invention can be crosslinked even without containing an acid acceptor such as a metal oxide, a metal hydroxide, or a hydrotalcite. An acid acceptor may be added to the extent that the effects of the invention are not impaired, but is preferably used in an amount as small as possible so as to achieve good acid resistance of a molded article after crosslinking. The amount of a metal oxide and a metal hydroxide in the fluoroelastomer composition is preferably 0 to 10.0 parts by mass, more preferably 0 to 3.0 parts by mass, still more preferably 0 to 1.0 parts by mass, further more preferably 0 to 0.5 parts by mass, relative to 100 parts by mass of the fluorine-containing elastomer. Particularly preferably, the fluoroelastomer composition contains neither metal oxide nor a metal hydroxide. More than 10.0 parts by mass of a metal oxide and a metal hydroxide tends to cause significantly poor acid resistance of a molded article after crosslinking. The aforementioned amount of a metal oxide and a metal hydroxide refers to the sum of the amount of a metal oxide and the amount of a metal hydroxide.

Examples of the metal oxide include calcium oxide, titanium oxide, magnesium oxide, zinc oxide, lead oxide, and barium oxide. Examples of the metal hydroxide include magnesium hydroxide and calcium hydroxide.

The amount of the hydrotalcite in the fluoroelastomer composition is preferably 0 to 10.0 parts by mass, more preferably 0 to 5.0 parts by mass, still more preferably 0 to 3.0 parts by mass, further more preferably 0 to 1.0 parts by mass, relative to 100 parts by mass of the fluorine-containing elastomer. Particularly preferably, the fluoroelastomer composition contains no hydrotalcite. More than 10.0 parts by mass of a hydrotalcite tends to cause significantly poor acid resistance of a molded article after crosslinking.

The fluoroelastomer composition of the invention can be crosslinked even without containing an onium salt such as a quaternary organic phosphonium salt or a quaternary ammonium salt. An onium salt may be added to the extent that the effects of the invention are not impaired, but is preferably used in an amount as small as possible so as to achieve good sealability of a molded article after crosslinking. The amount of the onium salt is preferably 0.1 parts by mass or less relative to 100 parts by mass of the fluorine-containing elastomer. More preferably, the fluoroelastomer composition contains no onium salt.

The fluoroelastomer composition of the invention may further contain any usual rubber compounding agents as appropriate, such as a filler, a processing aid, a plasticizer, a colorant, a tackifier, an adhesive aid, a pigment, a flame retardant, a lubricant, a photostabilizer, a weather-resistance stabilizer, an antistatic, an ultraviolet absorber, an antioxidant, a release agent, a blowing agent, a perfume, an oil, and a softening agent, as well as other polymers such as polyethylene, polypropylene, polyamide, polyester, and polyurethane, to the extent that the effects of the invention are not impaired.

Examples of the filler include carbonates such as magnesium carbonate, aluminum carbonate, calcium carbonate, and barium carbonate; silicates such as magnesium silicate, calcium silicate, sodium silicate, and aluminum silicate; sulfates such as aluminum sulfate, calcium sulfate, and barium sulfate; synthetic hydrotalcites; metal sulfides such as molybdenum disulfide, iron sulfide, and copper sulfide; and diatomite, asbestos, lithopone (zinc sulfide/barium sulfide), graphite, carbon black, carbon fluoride, calcium fluoride, coke, quartz fine powder, talc, mica powder, wollastonite, carbon fiber, aramid fiber, a variety of whiskers, glass fiber, organic reinforcing agents, organic filler, polytetrafluoroethylene, mica, silica, celite, and clay. Any of these fillers may be added in any step in the kneading process to be described later, and are preferably added in kneading using a closed-type kneader or a roll kneader.

In order to achieve good physical properties of a molded article after crosslinking, carbon black is preferred. Examples of the carbon black include, but are not limited to, thermal black such as MT carbon, furnace black such as SRF carbon and MAF carbon, Ketjenblack, channel black, acetylene black, lamp black, and bituminous coal. In order to achieve good physical properties after crosslinking, MT carbon is preferred. The amount of the filler such as carbon black is preferably, but not limited to, 0 to 150 parts by mass, more preferably 1 to 100 parts by mass, still more preferably 2 to 50 parts by mass, relative to 100 parts by mass of the fluorine-containing elastomer.

Examples of the processing aid include higher fatty acids such as stearic acid, oleic acid, palmitic acid, and lauric acid; higher fatty acid salts such as sodium stearate and zinc stearate; higher fatty acid amides such as stearamide and oleamide; higher fatty acid esters such as ethyl oleate; animal- or plant-based waxes such as carnauba wax; mineral-based waxes such as ceresin wax; petroleum-based waxes such as paraffin wax; polyglycols such as ethylene glycol, glycerol, and diethylene glycol; aliphatic hydrocarbons such as vaselline and paraffin; silicone oils, silicone polymers, low molecular weight polyethylene, phthalic acid esters, phosphoric acid esters, rosin, (halogenated) dialkyl amines, surfactants, sulfone compounds, fluorine-based aids, and organic amine compounds.

The fluoroelastomer composition of the invention is obtainable by kneading a fluorine-containing elastomer, an organic peroxide, and a co-crosslinking agent, optionally together with other compounding agents such as filler as appropriate, using a rubber kneading device commonly used. Examples of the rubber kneading device include a roll, a kneader, a Banbury mixer, an internal mixer, or a twin-screw extruder.

The fluoroelastomer composition may of course be crosslinked by a common method such as press crosslinking, steam crosslinking, or oven crosslinking. Also, the cross-linking reaction may be performed under any conditions, such as at normal pressure, under pressure, or under reduced pressure, and in the air. The crosslinking conditions may appropriately be determined in accordance with, for example, the type of a crosslinker to be used. The crosslinking is usually performed by heating at 130° C. to 230° C. for 1 minute to 24 hours. In the case of press crosslinking or steam crosslinking, the temperature is preferably 130° C. to 230° C. and the crosslinking duration may be at least such that the crosslinking time reaches T90, and may be 1 minute to 3 hours, for example. In the case of oven crosslinking thereafter (i.e., after press crosslinking or steam crosslinking), the temperature is preferably 150° C. to 250° C. and the crosslinking duration is preferably 1 to 48 hours, for example. Still, oven crosslinking is not necessarily performed.

The invention also relates to a molded article obtainable by crosslinking the fluoroelastomer composition. The molded article of the invention may be produced by molding the fluoroelastomer composition of the invention and crosslinking the resulting molded article, or may be produced by simultaneously performing the molding and the crosslinking. The molded article may also be obtainable in the form of a film by applying and crosslinking a crosslinkable composition.

Examples of the molding method include, but are not limited to, compression molding, extrusion molding, transfer molding, and injection molding.

The amount of iodine or bromine in the fluoroelastomer composition and in a molded article obtainable by crosslinking the fluoroelastomer composition may be determined by quantitative analysis. Specifically, a sample (the fluoroelastomer composition or a molded article obtainable by crosslinking the fluoroelastomer composition) is combusted to generate a gas. This gas is made to be absorbed by a collection liquid, and the liquid is subjected to X-ray fluorescence analysis. The iodine content can also be determined as follows. Specifically, 12 mg of a sample is mixed with 5 mg of $Na_2SO_3$. Separately, 30 mg of a mixture of $Na_2CO_3$ and $K_2CO_3$ (mass ratio=1:1) is dissolved in 20 ml of pure water to prepare an absorption liquid. With this absorption liquid, the sample mixture is burnt in the presence of oxygen in a quartz combustion flask. The product is left for 30 minutes, and then analyzed using an ion chromatograph 20A (Shimadzu Corp.).

The glass transition temperature of the fluoroelastomer composition and of a molded article obtainable by crosslinking the fluoroelastomer composition may be determined as follows. Specifically, using a differential scanning calorimeter (DSC822e, Mettler-Toledo International Inc.), 10 mg of a sample (the fluoroelastomer composition or a molded article obtainable by crosslinking the fluoroelastomer composition) is cooled down to −75° C. and then heated at a rate of 10° C./min to give a DSC curve. Next, the temperature is read at the intermediate point of two intersections between each of the extension lines of the base lines before and after the secondary transition of the DSC curve and the tangent line at the inflection point of the DSC curve.

The molded article of the invention is inexpensive and has excellent heat-aging resistance, and thus can be used for a variety of parts in fields such as the automotive industry, the aircraft industry, and the semiconductor industry.

Examples of the fields where the molded article is used include the field relating to semiconductors, the field of automobiles, the field of aircraft, the field of space and rockets, the field of shipping, the field of chemistry, such as chemical plants, the field of chemicals, such as pharmaceuticals, the field of photography, such as film processors, the field of printing, such as printers, the field of coating, such as coating equipment, the field of analysis and physical and chemical instruments, such as analyzers and measuring devices, the field of food machinery, such as food plant equipment and household items, the field of beverage and food production equipment, the field of drug production equipment, the field of medical parts, the field of equipment for transporting chemicals, the field of equipment for nuclear power plants, the field of steel, such as sheet steel processing equipment, the field of general industry, the field of electrics, the field of fuel cells, the field of electronic parts, the field of parts of optical devices, the field of parts of space devices, the field of equipment for petrochemical plants, the field of parts of equipment for prospecting and mining energy sources such as petroleum and gas, the field of oil refining, and the field of parts of equipment for transporting petroleum.

The molded article of the invention may be used in any of various forms such as seal materials and packings, including rings, packings, gaskets, diaphragms, oil seals, bearing seals, lip seals, plunger seals, door seals, lip and face seals, gas delivery plate seals, wafer support seals, and barrel seals. The seal materials may be used in applications requiring heat resistance, solvent resistance, chemical resistance, and non-stickiness.

The molded article may also be used as any of tubes, hoses, rolls, a variety of rubber rolls, flexible joints, rubber plates, coatings, belts, dampers, valves, valve sheets, valve bodies, chemical-resistant coating materials, laminating materials, and lining materials.

The cross-sectional shapes of the above rings, packings, and seals may be any various shapes, such as a rectangular shape, an O-like shape, and a ferrule shape, and any deformed shapes such as D-like, L-like, T-like, V-like, X-like, or Y-like shapes.

In the field relating to semiconductors, the molded article may be used for semiconductor manufacturing devices, liquid crystal panel manufacturing devices, plasma panel manufacturing devices, plasma display panel manufacturing devices, plasma addressed liquid crystal panel manufacturing devices, organic EL panel manufacturing devices, field emission display panel manufacturing devices, solar cell substrate manufacturing devices, and semiconductor transporting devices. Examples of such devices include CVD devices, gas control devices, such as gas control devices for semiconductors, dry etching devices, wet etching devices, plasma etching devices, reactive ion etching devices, reactive ion beam etching devices, sputter etching devices, ion beam etching devices, diffusion and oxidation devices, sputtering devices, ashing devices, plasma ashing devices, washing devices, ion implantation devices, plasma CVD devices, exhaust devices, exposure devices, grinding devices, film-forming devices, dry-etching washing devices, $UV/O_3$ washing devices, ion beam washing devices, laser beam washing devices, plasma washing devices, gas etching washing devices, extraction washing devices, Soxhlet extraction washing devices, high-temperature high-pressure extraction washing devices, microwave extraction washing devices, supercritical extraction washing devices, washing devices using hydrofluoric acid, hydrochloric acid, sulfuric acid, or ozonated water, steppers, coaters and developers, CMP devices, excimer laser exposure devices, chemical liquid pipes, gas pipes, devices involving plasma treatment, such as $NF_3$ plasma treatment, $O_2$ plasma treatment, or fluorine plasma treatment, heating film-forming devices, wafer transporting devices, wafer washing devices, silicon wafer washing devices, silicon wafer processing devices, devices used in LP-CVD, devices used in lamp annealing, and devices used in reflow.

Specific examples of applications in the field relating to semiconductors include seal materials such as O-rings and gaskets for gate valves, quartz windows, chambers, chamber lids, gates, bell jars, couplings, and pumps; seal materials such as O-rings, hoses, and tubes for resist developers and strippers; lining and coating of resist developer tanks, stripper tanks, wafer cleaning liquid tanks, and wet etching tanks; diaphragms of pumps; rolls for transporting wafers; hoses and tubes for wafer cleaning liquids; seal materials for clean equipment, such as sealants for clean equipment such as cleanrooms; sealing materials for storage cabinets for devices such as semiconductor manufacturing devices and wafers; and diaphragms for transporting chemical liquids used in production of semiconductors.

In the field of automobiles, the molded article may be used for engine bodies, main drive systems, valve train systems, lubrication and cooling systems, fuel systems, intake and exhaust systems, transmission systems of driveline systems, steering systems and braking systems of chassis, and electrical parts such as basic electrical parts, electrical parts of control systems, electrical accessories. The field of automobiles also relates to motorcycles.

In relation to the aforementioned engine bodies and peripherals thereof, the molded article of the invention may be used for seal materials requiring heat resistance, oil resistance, fuel oil resistance, resistance to antifreeze for engine cooling, and steam resistance. Examples of such seal materials include seals such as gaskets, shaft seals, and valve stem seals, non-contact or contact packings such as self-seal packings, piston rings, split ring packings, mechanical seals, and oil seals, bellows, diaphragms, hoses, tubes, and seal materials used for electric wires, cushioning materials, damping materials, and belt AT devices.

Specific examples of applications in the fuel systems include O-rings used for fuel injection systems, cold start injectors, quick connectors of fuel lines, sender flange quick connectors, fuel pumps, fuel tank quick connectors, gasoline mixing pumps, gasoline pumps, tube bodies of fuel tubes, connectors of fuel tubes, and injectors; seals used for exhaust manifolds, fuel filters, pressure control valves, canisters, caps of fuel tanks, fuel pumps, fuel tanks, sender units of fuel tanks, fuel injection systems, high pressure fuel pumps, fuel line connector systems, pump timing control valves, suction control valves, solenoid sub-assemblies, and fuel cut valves; canister purge solenoid valve seals, onboard refueling vapor recovery (ORVR) valve seals, oil seals for fuel pumps, fuel sender seals, fuel tank roll over valve seals, filler seals, injector seals, filler cap seals, and seals of filler cap valves; hoses such as fuel hoses, fuel supply hoses, fuel return hoses, vapor (evaporator) hoses, vent (breather) hoses, filler hoses, filler neck hoses, hoses inside fuel tanks (in-tank hoses), control hoses of carburetors, fuel inlet hoses, and fuel breather hoses; gaskets used for fuel filters and fuel line connector systems, and flange gaskets used for carburetors; lining materials for vapor recovering lines, fuel feed lines, and vapor ORVR lines; diaphragms used for canisters, ORVR, fuel pumps, fuel tank pressure sensors, gasoline pumps, sensors of carburetors, combined air controlling (CAC) systems, pulsation dampers, canisters, and auto-valves, and pressure regulator diaphragms of fuel injection systems; valves for fuel pumps, carburetor needle valves, roll over check valves, and check valves; tubes used in vents (breathers) and fuel tanks; tank packings of, for example, fuel tanks, and packings of acceleration pump pistons of carburetors; fuel sender damping parts for fuel tanks; O-rings and diaphragms for regulating fuel pressure; accelerator pump cups; in-tank fuel pump mounts; injector cushion rings of fuel injection systems; injector seal rings; needle valve cores of carburetors; acceleration pump pistons of carburetors; valve sheets of combined air controlling (CAC) systems; fuel tank bodies; and sealing parts for solenoid valves.

Specific examples of applications in the brake systems include diaphragms used for mastervacs, hydraulic brake hoses, air brakes, and brake chambers of air brakes; hoses used as brake hoses, brake oil hoses, and vacuum brake hoses; a variety of seal materials such as oil seals, O-rings, packings, and brake piston seals; air valves and vacuum valves for mastervacs, and check valves for brake valves; piston cups (rubber cups) for master cylinders and brake cups; and O-rings and grommets for master cylinders and vacuum boosters of hydraulic brakes, boots for wheel cylinders of hydraulic brakes, and anti-lock brake systems (ABS).

Specific examples of applications in the basic electrical parts include insulators and sheaths of electric wires (harnesses), tubes of harness exterior parts, and grommets for connectors.

Specific examples of applications in the electrical parts of control systems include coating materials of various sensor lines.

Specific examples of applications in the electrical accessories include O-rings and packings of automobile air conditioners, cooler hoses, high-pressure air conditioner hoses, air conditioner hoses, gaskets for electronic throttle units, plug boots for direct ignition, and diaphragms for distributors. Further, the molded article may be used for bonding of electric parts.

Specific examples of applications in the intake and exhaust systems include packings used for intake manifolds and exhaust manifolds and throttle body packings of throttles; diaphragms used for exhaust gas recirculation (EGR) systems, back pressure transducers (BPTs), wastegates, turbocharger wastegates, actuators, actuators of variable turbine geometry (VTG) turbochargers, and exhaust purifying valves; hoses such as control hoses of exhaust gas recirculation (EGR) systems, emission control hoses, turbo oil hoses (feed side), turbo oil hoses (return side), turbo air hoses, and intercooler hoses of turbochargers, turbocharger hoses, hoses connected with compressors of turbo engines equipped with intercoolers, exhaust gas hoses, air intake hoses, turbo hoses, and diesel particulate filter (DPF) sensor hoses; air ducts and turbo air ducts; intake manifold gaskets; and seal materials of EGR systems, valve sheets for preventing after burn of AB valves, turbine shaft seals (of turbochargers, for example), and seal parts used for groove parts of rocker covers and air intake manifolds used in engines of automobiles.

In addition, with respect to the exhaust gas control parts, the molded article may be used as any of seals used for vapor recovery canisters, catalytic converters, exhaust gas sensors, and oxygen sensors and seals for solenoid armatures of vapor recovery and vapor canisters; and intake manifold gaskets.

With respect to the diesel engine-related parts, the molded article may be used as any of O-ring seals for direct injectors, rotary pump seals, control diaphragms, fuel hoses, EGR systems, priming pumps, and diaphragms of boost compensators. The molded article may also be used for O-rings, seal materials, hoses, tubes, and diaphragms used in urea SCR systems, urea solution tank bodies of urea SCR systems, and seal materials of urea solution tanks.

Specific examples of applications in the transmission systems include transmission-related bearing seals, oil seals, O-rings, packings, and torque converter hoses.

Examples of applications also include mission oil seals, and mission oil hoses, ATF hoses, O-rings, and packings of AT.

Examples of the transmission include automatic transmission (AT), manual transmission (MT), continuously variable transmission (CVT), and dual clutch transmission (DCT).

Examples of applications also include oil seals, gaskets, O-rings, and packings for manual or automatic transmissions, oil seals, gaskets, O-rings, and packings for (belt-type or toroidal-type) continuously variable transmissions, packings for ATF linear solenoids, oil hoses for manual transmissions, ATF hoses for automatic transmissions, and CVTF hoses for (belt-type or toroidal-type) continuously variable transmissions.

Specific examples of applications in the steering systems include power steering oil hoses and high-pressure power steering hoses.

Examples of applications used in engine bodies of automobile engines include gaskets such as cylinder head gaskets, cylinder head cover gaskets, oil pan packings, and general gaskets, seals such as O-rings, packings, and timing belt cover gaskets, hoses such as control hoses, damper rubbers of engine mounts, control valve diaphragms, and camshaft oil seals.

Examples of applications in the main drive systems of automobile engines include shaft seals such as crankshaft seals and camshaft seals.

Examples of applications in the valve train systems of automobile engines include valve stem oil seals of engine valves and valve sheets of butterfly valves.

Examples of applications in the lubrication and cooling systems of automobile engines include engine oil cooler hoses of engine oil coolers, oil return hoses, seal gaskets, water hoses used around radiators, seals of radiators, gaskets of radiators, O-rings of radiators, vacuum pump oil hoses of vacuum pumps, radiator hoses, radiator tanks, diaphragms for oil pressure, and fan coupling seals.

As mentioned above, specific examples of applications in the field of automobiles include engine head gaskets, oil pan gaskets, manifold packings, seals for oxygen sensors, oxygen sensor bushes, seals for nitrogen oxide (NOx) sensors, nitrogen oxide (NOx) sensor bushes, seals for sulfur oxide sensors, seals for temperature sensors, temperature sensor bushes, seals for diesel particulate filter sensors, diesel particulate filter sensor bushes, injector O-rings, injector packings, O-rings and diaphragms of fuel pumps, gearbox seals, power piston packings, seals of cylinder liners, seals of valve stems, static valve stem seals, dynamic valve stem seals, front pump seals of automatic transmissions, rear axle pinion seals, gaskets of universal joints, pinion seals of speedometers, piston cups of foot brakes, O-rings and oil seals of torque transmission systems, seals and bearing seals of exhaust gas re-combustion systems, hoses for re-combustion systems, diaphragms for sensors of carburetors, damper rubbers (e.g., engine mounts, exhaust parts, muffler hangers, suspension bushes, center bearings, strut bumper rubbers), damper rubbers (e.g., strut mounts, bushes) for suspensions, drive system damper rubbers (e.g., dampers), fuel hoses, tubes and hoses of EGR systems, twin carburetor tubes, cores of needle valves of carburetors, flange gaskets of carburetors, oil hoses, oil cooler hoses, ATF hoses, cylinder head gaskets, water pump seals, gearbox seals, needle valve tips, reeds of reed valves for motorcycles, oil seals of automobile engines, seals of gasoline hose guns, seals for automobile air conditioners, rubber hoses for intercoolers of engines, seals of fuel line connector systems, CAC valves, needle tips, electric wires around engines, filler hoses, automobile air conditioner O-rings, intake gaskets, fuel tank materials, diaphragms for distributors, water hoses, clutch hoses, PS hoses, AT hoses, mastervac hoses, heater hoses, air conditioner hoses, ventilation hoses, oil filler caps, PS rack seals, rack and pinion boots, CVJ boots, ball joint dust covers, strut dust covers, weather strips, glass run channels, center unit packings, body side welts, bumper rubbers, door latches, dash insulators, high tension cords, flat belts, poly V-belts, timing belts, toothed belts, V-ribbed belts, tires, wiper blades, diaphragms and plungers for regulators of LPG vehicles, diaphragms and valves for regulators of CNG vehicles, DME-resistant rubber parts, diaphragms and boots of automatic belt tensioners, diaphragms and valves for idle speed control, actuators for cruise control, diaphragms, check valves, and plungers of negative-pressure pumps, diaphragms and O-rings of O.P.S., gasoline pressure relief valves, O-rings and gaskets of engine cylinder sleeves, O-rings and gaskets of wet cylinder sleeves, seals and gaskets of differential gears (seals and gaskets for gear oils), seals and gaskets of power steering systems (seals and gaskets of PSF), seals and gaskets of shock absorbers (seals and gaskets of SAF), seals and gaskets of constant-velocity joints, seals and gaskets of wheel bearings, coatings for metal gaskets, caliper seals, boots, wheel bearing seals, and bladders used in crosslink molding of tires.

In the fields of aircraft, space and rockets, and shipping, the molded article may especially be used in the fuel systems and the lubrication systems.

In the field of aircraft, the molded article may be used as, for example, any of seal parts for aircraft, parts for aircraft used in relation to engine oils for aircraft, jet engine valve stem seals, gaskets, O-rings, rotary shaft seals, gaskets of hydraulic equipment, fire wall seals, hoses, gaskets, and O-rings for fuel feed, and cables, oil seals, and shaft seals for aircraft.

In the field of space and rockets, the molded article may be used as, for example, any of lip seals, diaphragms, and O-rings of spacecraft, jet engines, and missiles, 0-rings resistant to oils for gas turbine engines, and damper stage pads for ground level control of missiles.

In the field of shipping, the molded article may be used as, for example, any of propeller shaft stern seals of screws, valve stem seals for intake and exhaustion of diesel engines, valve seals of butterfly valves, valve sheets and shaft seals of butterfly valves, shaft seals of butterfly valves, stern tube seals, fuel hoses and gaskets, O-rings for engines, cables for shipping, oil seals for shipping, and shaft seals for shipping.

In the field of chemistry such as chemical plants and the field of chemicals such as pharmaceuticals, the molded article may be used in steps requiring high-level chemical resistance, such as steps of manufacturing chemicals, including pharmaceuticals, agrochemicals, coating materials, and resins.

Specific examples of applications in the fields of chemistry and chemicals include: seals used for chemical devices, pumps for chemicals, flow meters, pipes for chemicals, heat exchangers, agrochemical sprayers, agrochemical transporting pumps, gas pipes, fuel cells, analyzers and physical and chemical instruments (e.g., column fittings of analyzers and measuring instruments), expansion joints of flue-gas desulfurization devices, nitric acid plants, and turbines of power plants, seals used in medical sterilization processes, seals for plating solutions, runner seals of belts for papermaking, and joint seals of wind tunnels; O-rings used in chemical devices such as rectors and stirrers, analyzers and measuring instruments, chemical pumps, pump housings, valves, and tachometers, O-rings for mechanical seals, and O-rings for compressor sealing; packings used in high-temperature vacuum dryers and tube joints of gas chromatographs and pH meters, and glass cooler packings of sulfuric acid manufacturing devices; diaphragms used in diaphragm pumps, analyzers, and physical and chemical instruments; gaskets used in analyzers and measuring instruments; ferrules used in analyzers and measuring instruments; valve sheets; U-cups; linings used in chemical devices, gasoline tanks, and wind tunnels, and corrosion-resistant linings of tanks for anodizing on aluminum; coatings of masking jigs for plating; valve parts of analyzers and physical and chemical instruments; expansion joints of flue-gas desulfurization plants; hoses resistant to acids such as concentrated sulfuric acid, chlorine gas transporting hoses, oil-resistant hoses, and rainwater drainage hoses of benzene or toluene storage tanks; chemical-resistant tubes used in analyzers and physical and chemical instruments and medical tubes; trichloroethylene-resistant rolls for fiber dyeing and rolls for dyeing; stoppers for pharmaceuticals; medical rubber stoppers; chemical bottles, chemical tanks, bags, and chemical containers; strong acid-resistant and solvent-resistant protective items such as gloves and boots.

In the field of photography such as film processors, the field of printing such as printers, and the field of coatings such as coating equipment, the molded article may be used as any of rolls, belts, seals, and valve parts of dry copiers.

Specific examples of applications in the field of photography, the field of printing, and the field of coatings include surface layers of transfer rollers of copiers, cleaning blades of copiers, and belts of copiers; rolls (e.g., fixing rolls, adhesion rolls, and pressure rolls) and belts for OA equipment such as copiers, printers, and faxes; rolls, roll blades, and belts of PPCs; rolls of film processors and X-ray film processors; printing rolls, scrapers, tubes, valve parts, and belts of printing equipment; ink tubes, rolls, and belts of printers; application rolls, scrapers, tubes, and valve parts of application or coating equipment; processing rolls, gravure rolls, guide rolls, guide rolls of coating lines for manufacturing of magnetic tapes, and gravure rolls and coating rolls of coating lines for manufacturing of magnetic tapes.

In the field of food machinery such as food plant equipment and household items, the molded article may be used in steps of food production, food transportation, and food storage.

Specific examples of applications in the field of food machinery include seals of plate-type heat exchangers, solenoid valve seals of vending machines, packings of thermo pots, sanitary pipe packings, packings of pressure cookers, seals of boilers, gaskets for heat exchangers, diaphragms and packings for food processing treatment equipment, rubber materials (e.g., seals such as heat exchanger gaskets, diaphragms, and O-rings, pipes, hoses, sanitary packings, valve packings, packings for filling used as joints between the mouth of a container such as a bottle and a filler) for food processing treatment equipment. The molded article may also be used as packings, gaskets, tubes, diaphragms, hoses, and joint sleeves used for products such as alcohols and soft drinks, filling devices, food sterilizers, brewing devices, boilers, and food vending machines.

In the field of equipment for nuclear power plants, the molded article may be used as, for example, any of check valves and reducing valves around reactors and seals of devices for concentration of uranium hexafluoride.

Specific examples of applications in the field of general industry include seal materials for hydraulic devices such as machine tools, construction machinery, and hydraulic machines; seals and bearing seals of hydraulic, lubricating machinery; seal materials used in mandrels; seals used for windows of dry cleaning devices; seals and (vacuum) valve seals of cyclotrons, seals of proton accelerators, seals of automatic wrapping machines, diaphragms of pumps for analyzers (air pollution monitoring devices) for sulfurous acid gas or chlorine gas in the air, snake pump lining, rolls and belts of printers, belts (conveyor belts) for transportation, squeeze rolls for pickling of sheet steel, cables of robots, solvent squeezing rolls in aluminum rolling lines, O-rings of couplers, acid-resistant cushioning materials, dust seals and lip rubbers of sliding portions of cutting machinery, gaskets of garbage incinerators, friction materials, metal or rubber surface modifiers, and covering materials. The molded article may also be used as gaskets and seal materials of devices used in papermaking processes, sealing agents of filter units for cleanrooms, sealing agents for construction, protective coatings for concrete and cement, glass cloth impregnating materials, processing aids for polyolefins, moldability improving additives for polyethylene, fuel containers of small generators and lawn mowers, and pre-coated metals prepared by primer-treating metal plates. The perfluoroelastomer composition may also be permeated into fabrics and then sintered, so that the resulting workpieces may be used as sheets or belts.

Specific examples of applications in the field of steel include sheet steel processing rolls of sheet steel processing equipment.

Specific examples of applications in the field of electrics include insulating oil caps of Shinkansen, venting seals of liquid-immersed transformers, seals of transformers, jackets of oil well cables, seals of ovens such as electric furnaces, window frame seals of microwave ovens, seal materials used in bonding wedges and necks of CRTs, seal materials of halogen lamps, fixing agents for electric parts, seal materials for treating terminals of sheathed heaters, and seal materials used in insulating and damp-proofing treatment on wire terminals of electrical devices. The molded article may also be used as a covering material for oil- and heat-resistant electric wires, highly heat-resistant electric wires, chemical-resistant electric wires, highly insulating electric wires, high voltage power lines, cables, electric wires used in geothermal power generation devices, and electric wires used around automobile engines. The molded article may also be used as any of oil seals and shaft seals of cables for vehicles. The molded article may also be used as any of electrically insulating materials (e.g., materials used for insulating spacers of electric devices, insulating tapes used at joints and ends of cables, and heat-shrinkable tubes) and materials for electric and electronic devices used in high-temperature atmosphere (e.g., lead wire materials for motors and electric wire materials used around high-temperature furnaces). The molded article may also be used as any of sealing layers and protecting films (back sheets) of solar cells.

In the field of fuel cells, the molded article may be used as, for example, any of seal materials between electrodes or between an electrode and a separator in polymer electrolyte fuel cells and phosphoric acid salt fuel cells, and seals, packings, and separators of pipes for hydrogen, oxygen, or generated water.

In the field of electronic parts, the molded article may be used as, for example, any of heat-radiating materials, electromagnetic-wave-shielding materials, and gaskets for hard disk drives (magnetic recording devices) of computers. The molded article may also be used as shock-absorbing rubbers (crash stoppers) of hard disk drives, binders for electrode active materials of nickel hydrogen secondary batteries, binders for active materials of lithium ion batteries, polymer electrolytes of lithium secondary batteries, binders for positive electrodes of alkaline storage batteries, binders for EL elements (electroluminescent elements), binders, seal materials, and sealing agents for electrode active materials of capacitors, covering materials for quartz of optical fibers, films and sheets such as covering materials for optical fibers, potting, coating, or bonding seals for electronic parts and circuit boards, fixing agents for electronic parts, modifiers for seal materials such as epoxy compounds, coatings for printed circuit boards, modifiers for printed circuit board prepreg resins such as epoxy compounds, scattering inhibitors for electric light bulbs, gaskets for computers, large computer cooling hoses, packings such as gaskets and O-rings for secondary batteries, especially lithium secondary batteries, sealing layers, connectors, and dampers covering one or both of outside surfaces of organic EL structures.

In the field of equipment for transporting chemicals, the molded article may be used as, for example, any of safety valves and loading valves of trucks, trailers, tank trucks, and shipping.

In the field of parts of equipment for prospecting and mining energy sources such as petroleum and gas, the molded article may be used as, for example, any of seal materials used in mining petroleum or natural gas and boots of electric connectors used in oil wells.

Specific examples of applications in the field of parts of equipment for prospecting and mining energy sources include drill bit seals, pressure-control diaphragms, seals of horizontal drilling motors (stators), stator bearing (shaft) seals, seal materials used in blowout preventers (BOP), seal materials used in rotary blowout preventers (pipe wipers), seal materials and gas-liquid connectors used in measurement while drilling systems (MWD), logging tool seals (e.g., O-rings, seals, packings, liquid-gas connectors, and boots) used in logging equipment, expandable packers and completion packers, and packer seals used therefor, seals and packings used in cementing devices, seals used in perforators (perforating devices), seals, packings, and motor linings used in mud pumps, covers of underground sound inspection devices, U-cups, composition seating cups, rotary seals, laminate elastomeric bearings, seals for flow control, seals for sand control, seals of safety valves, seals of hydraulic fracturing equipment, seals and packings of linear packers and linear hangers, seals and packings of well heads, seals and packings of chokes and valves, seal materials for logging while drilling (LWD) systems, diaphragms used in prospecting and mining petroleum (e.g., diaphragms for feeding lubricants in petroleum mining pits), gate valves, electronic boots, and seal elements of perforating guns.

The molded article may also be used as for example, any of joint seals in kitchens, bathrooms, and lavatories; fabrics of outdoor tents; seal materials for materials of stamps; rubber hoses for gas heat pumps and Freon-resistant rubber hoses; films, linings, and weather-resistant covers for agriculture; and tanks of laminated sheet steel used in the field of construction or home appliances.

The molded article may also be used as an article bonded to a metal such as aluminum. Examples of such applications include door seals, gate valves, pendulum valves, and solenoid tips, as well as piston seals and diaphragms bonded to metal and metal rubber parts such as metal gaskets bonded to metal.

The molded article may also be used as any of rubber parts, brake shoes, and brake pads of bicycles.

One exemplary form of the molded article of the invention is a belt. Such a belt is also an aspect of the invention.

Examples of the belt include the following: power transmission belts (including flat belts, V-belts, V-ribbed belts, toothed belts), and transportation belts (conveyor belts) such as flat belts used for portions exposed to high temperatures, such as portions around engines of agricultural machinery, machine tools, and industrial machinery; conveyor belts for transporting scattered matters or particles of coal, smashed rock, earth and sand, ores, and wood chips at high temperatures; conveyor belts used in iron mills, such as blast furnaces; conveyor belts used for applications exposed to high temperatures in high precision machine assembling factories and food factories; V-belts and V-ribbed belts for agricultural machinery, general equipment (e.g., OA equipment, printers, dryers for business purposes), and automobiles; power transmission belts of transporting robots; toothed belts such as power transmission belts of food machinery and machine tools; and toothed belts for automobiles, CA equipment, medical uses, and printers.

In particular, timing belts are typical toothed belts for automobiles.

The belt of the invention may have a single layer structure or a multi-layer structure.

In the case of a multi-layer structure, the belt of the invention may have a layer obtainable by crosslinking the fluoroelastomer composition of the invention and a layer of another material.

Examples of the layer of another material in the multi-layer belt include a layer formed from a different rubber, a layer formed from thermoplastic resin, a fiber-reinforced layer, a canvas layer, and a metal foil layer.

The molded article of the invention may also be used as any of damper pads for industrial use, damper mats, slab mats for railways, pads, and damper rubbers for automobiles. Examples of the damper rubbers for automobiles include damper rubbers for engine mounts, motor mounts, member mounts, strut mounts, bushes, dampers, muffler hangers, or center bearings.

Examples of other applications include joint parts such as flexible joints and expansion joints, boots, and grommets. In the field of shipping, the molded article may be used for marine pumps.

The joint parts are joints used for pipes and piping equipment, and are used for preventing vibrations and noises generated by piping systems, absorption of expansion and contraction or displacement due to temperature change and pressure change, absorption of dimensional changes, and mitigation or prevention of influences due to earthquakes or land subsidence.

The flexible joints and expansion joints may be preferably used as molded articles with complicated shapes for shipbuilding piping, piping of machinery such as pumps and compressors, chemical plant piping, electric piping, piping of civil engineering works and waterworks, and automobiles.

The boots may be preferably used as molded articles with complicated shapes, such as boots for various industries, including boots for automobiles such as constant-velocity joint boots, dust covers, rack and pinion steering boots, pin boots, and piston boots, boots for agricultural machinery, boots for industrial vehicles, boots for construction machinery, boots for hydraulic machinery, boots for pneumatic machinery, boots for centralized lubrication systems, boots for liquid transportation, boots for firefighting, and boots for liquefied gas transportation.

The molded article of the invention may also be used as any of diaphragms for filter presses, diaphragms for blowers, diaphragms for water supply, diaphragms for liquid storage tanks, diaphragms for pressure switches, diaphragms for accumulators, and diaphragms for air springs such as suspensions.

Addition of the molded article of the invention to rubber or resin enables production of slip inhibitors capable of providing molded articles and coats which are less likely to cause slippage in environments where the articles or coats become wet by moisture such as rain, snow, ice, or sweat.

The molded article of the invention may also be used as a cushioning material for heat-press molding in production of decorative plywood, printed circuit boards, electrically insulated plates, and hard polyvinyl chloride laminates from melamine resin, phenol resin, or epoxy resin.

The molded article of the invention may also contribute to give impermeability to various supporters such as sealing gaskets related to weapons and protective clothing against contact with invasive chemicals.

The molded article may also be used as any of O-rings (square-rings), V-rings, X-rings, packings, gaskets, diaphragms, oil seals, bearing seals, lip seals, plunger seals, door seals, lip and face seals, gas delivery plate seals, wafer support seals, barrel seals, and other seal materials for sealing lubricants (e.g., engine oil, mission oil, gear oil), fuel oils, or greases (in particular, urea grease) containing amine-type additives (in particular, amine-type additives used as antioxidants, detergents, or dispersants) used in transports such as automobiles and shipping. The molded article may also be used as any of tubes, hoses, rubber rolls, coatings, belts, and valve bodies of valves. The molded article may also be used as any of laminating materials and lining materials.

The molded article may also be used as any of covering materials for heat- and oil-resistant electric wires used as, for example, electric wires of sensors contacting transmission oil and/or engine oil in internal combustion engines of automobiles and detecting the oil temperature and/or the oil pressure, and may be used in high-temperature environment such as the inside of oil pans of automatic transmissions or engines.

In addition, the molded article of the invention may be used with a crosslinked coat formed thereon. Specific examples of such applications include non-viscous oil-resistant rolls for copiers, weather-resistant freeze-preventive weather strips, rubber stoppers for infusion solution, vial rubber stoppers, release agents, non-viscous light-duty transport belts, adhesion-preventive coatings of pulley gaskets of automobile engine mounts, covering processing of synthetic fibers, and bolt parts or joints having a packing covering thin layer.

The applications of the molded article of the invention with respect to the automobile-related parts include motorcycle parts having the same configurations. Examples of the automobile-related fuels include light oil, gasoline, and fuels for diesel engines (including biodiesel fuel).

In addition to the above applications as the crosslinked molded article, the fluoroelastomer composition of the invention may also be used in various applications in various fields of industry. Thus, the following describes applications of the fluoroelastomer composition of the invention.

The fluoroelastomer composition of the invention may be used as any of surface modifiers for metal, rubber, plastic, or glass; seal materials and covering materials requiring heat resistance, chemical resistance, oil resistance, and non-stickiness, such as metal gaskets and oil seals; and non-viscous covering materials or bleed barriers for rolls for OA equipment and belts for OA equipment, and may be impregnated into or bake-applied to fabric sheets and belts.

With high viscosity and high concentration, the fluoroelastomer composition of the invention may be formed into any of seal materials, linings, and sealants having more complicated shapes by a usual method. With low viscosity, the perfluoroelastomer composition may be formed into thin films of several micrometers. With middle viscosity, the perfluoroelastomer composition may be applied to any of pre-coated metals, O-rings, diaphragms, and reed valves.

Further, the fluoroelastomer composition of the invention may be applied to any of rolls or belts for transporting fabric or paper, printing belts, chemical-resistant tubes, drug stoppers, and fuel hoses.

Examples of base materials to be covered with the fluoroelastomer composition of the invention include metals such as iron, stainless steel, copper, aluminum, and brass; glass products such as glass plates and woven or nonwoven fabric of glass fiber; molded articles of or articles covered with general-purpose heat-resistant resin such as polypropylene, polyoxymethylene, polyimide, polyamide imide, polysulfone, polyether sulfone, or polyether ether ketone; molded articles of or articles covered with general-purpose rubber such as SBR, butyl rubber, NBR, or EPDM or heat-resistant rubber such as silicone rubber or fluoroelastomer; and woven or nonwoven fabric of natural or synthetic fiber.

The covered articles formed from the fluoroelastomer composition of the invention may be used in the fields requiring heat resistance, solvent resistance, lubricity, and non-stickiness. Specific examples of applications thereof include rolls (e.g., fixing rolls, pressing rolls) and transporting belts for OA equipment such as copiers, printers, and faxes; sheets and belts; O-rings, diaphragms, chemical-resistant tubes, fuel hoses, valve seals, gaskets for chemical plants, and engine gaskets.

The fluoroelastomer composition of the invention may be dissolved in a solvent and then used as a coating material or an adhesive. The fluoroelastomer composition may also be used as a coating material in the form of emulsion dispersion (latex).

The composition may be used as any of seal materials and linings for various devices and pipes, and as any of surface-treating agents for structures formed of an inorganic or organic substrate such as metal, ceramic, glass, stone, concrete, plastic, rubber, wood, paper, or fiber.

The composition may be applied to any of the above substrates using a dispenser or by screen printing.

The fluoroelastomer composition of the invention may be used as a coating material composition for casting a film or for immersing a substrate such as fabric, plastic, metal, or elastomer therein.

In particular, the fluoroelastomer composition of the invention in the form of latex may be used for production of covered fabric, protective gloves, impregnated fibers, covers for O-rings, covers for quick connecting O-rings for fuel systems, covers for fuel system seals, covers for fuel tank rollover valve diaphragms, covers for fuel tank pressure sensor diaphragms, covers for oil filter and fuel filter seals, covers for fuel tank sender seals and for sender head fitting seals, covers for rolls of fixing mechanisms of copiers, and polymer coating material compositions.

These compositions are useful for covering silicone rubber, nitrile rubber, and other elastomers. In order to improve the heat stability thereof, as well as the permeation resistance and chemical resistance of substrate elastomers, these compositions are useful for covering parts produced from such elastomers. Examples of other applications include coverings for heat exchangers, expansion joints, vats, tanks, fans, flue ducts, and other ducts, and housing structures such as concrete housing structures. The composition may be applied to exposed cross sections of multi-layer parts in, for example, a production method for hose structures or diaphragms. Sealing materials at jointing portions and bonding portions are often formed of hard material, and the fluoroelastomer composition of the invention provides improved frictional interfaces and improved dimension interference fit with a reduced, slight amount of leakage along the sealed surface. The latex thereof improves the seal durability in applications of various automobile systems.

These materials can be used in production of power steering systems, fuel systems, and air conditioning systems, and any bonding portions where hoses and tubes are bonded to other parts. The composition shows its usefulness in repair of production defects (and damages due to use) in multi-layer rubber structures such as tri-layer fuel hoses. The composition is also useful for application to thin sheet steel which may be formed or embossed before or after the application of the coating material. For example, multiple covered steel layers may be assembled and a gasket may be disposed between two rigid metal parts. The sealing effect can be achieved by applying the fluoroelastomer composition of the invention to between the layers. This process may be used for producing engine head gaskets and exhaust manifold gaskets so as to decrease the bolt force and strain of assembled parts, while providing good saving and low release of fuel owing to little cracking, bending, and hole deformation.

The fluoroelastomer composition of the invention may also be used as coatings; substrate-integrated gaskets and packings formed by dispenser-molding the composition to substrates including inorganic materials such as metal or ceramic; and multi-layer articles prepared by covering substrates including inorganic materials such as metal or ceramic.

EXAMPLES

The invention will be described hereinbelow with reference to examples. The invention is not intended to be limited to these examples.

The materials used in the examples and comparative examples shown in Table 1 are as follows.

Fluorine-containing elastomer 1: fluorine-containing elastomer, VdF/HFP mole ratio: 78/22, Mooney viscosity ML1+20 (140° C.): 76, Mooney viscosity ML1+10 (121° C.): 105, iodine content: 0% by mass, bromine content: 0% by mass, glass transition temperature: −19° C.

Fluorine-containing elastomer 2: fluorine-containing elastomer, VdF/HFP mole ratio: 78/22, Mooney viscosity ML1+10 (121° C.): 80, iodine content: 0% by mass, bromine content: 0% by mass, glass transition temperature: −19° C.

Fluorine-containing elastomer 3: peroxide-crosslinkable fluorine-containing elastomer containing an iodine group at an end produced by iodine transfer polymerization, VdF/HFP mole ratio: 78/22, Mooney viscosity ML1+10 (121° C.): 37, iodine content: 0.18% by mass, bromine content: 0% by mass, glass transition temperature: −19° C.

Fluorine-containing elastomer 4: fluorine-containing elastomer, VdF/HFP mole ratio: 78/22, Mooney viscosity ML1+10 (121° C.): 46, iodine content 0% by mass, bromine content: 0% by mass, glass transition temperature: −19° C.

Fluorine-containing elastomer 5: fluorine-containing elastomer, VdF/HFP mole ratio: 78/22, Mooney viscosity ML1+10 (121° C.): 92, iodine content: 0.05% by mass, bromine content: 0% by mass, glass transition temperature: −19° C.

Carbon: carbon black N990

Co-crosslinking agent 1: TAIC M60 (trade name), powder containing 60% by mass of triallyl isocyanurate, Nippon Kasei Chemical Co., Ltd.

Co-crosslinking agent 2: triallyl isocyanurate

Organic peroxide 1: t-butyl peroxybenzoate

Organic peroxide 2: 2,5-dimethyl-2,5-di(t-butylperoxy)hexane

Organic peroxide 3: α,α'-bis(t-butylperoxy)-p-diisopropylbenzene

Organic peroxide 4: 2,5-dimethyl-2,5-di(benzoylperoxy)hexane

Examples 1 to 5 and Comparative Examples 1 to 5

The components shown in Table 1 were mixed in amounts shown in Table 1 and the mixture was kneaded at 30° C. to 50° C. by a common method using a roll. Thereby, a fluoroelastomer composition was prepared. The resulting fluoroelastomer composition was subjected to sheeting using an open roll. Thereby, a non-crosslinked fluoroelastomer sheet was obtained.

The resulting non-crosslinked fluoroelastomer sheet was press-crosslink-molded, i.e., subjected to primary crosslinking, and then subjected to secondary crosslinking using a heat oven. Thereby, a 2-mm-thick crosslinked sheet was produced. The primary crosslinking conditions were 175° C. and 15 minutes, and the secondary crosslinking conditions were 180° C. and 4 hours.

For the fluorine-containing elastomers used in the examples and the comparative examples, the Mooney viscosity was determined by the following method. For the fluoroelastomer compositions obtained, the crosslinkability was determined by the following method. For the non-crosslinked fluoroelastomer sheets obtained, the sheet moldability was examined by press-crosslink-molding. For the crosslinked sheets obtained, the normal-state physical properties and the heat-aging resistance were determined by the following methods.

<Mooney Viscosity (ML1+10 (121° C.))>

With each of the fluorine-containing elastomers 1 to 5, the Mooney viscosity (ML1+10 (121° C.)) was determined in conformity with ASTM D1646-15 and JIS K6300-1:2013.

Measurement device: model MV2000E available from Alpha Technologies Inc.

Rotational speed of rotor: 2 rpm

Measurement temperature: 121° C.

Measurement duration: the sample was pre-heated for one minute, immediately thereafter the rotor was initiated, and 10 minutes later, the value was determined.

<Mooney Viscosity (ML1+20 (140° C.))>

With the fluorine-containing elastomer 1, the Mooney viscosity (ML1+20 (140° C.)) was determined in conformity with ASTM D1646-15 and JIS K6300-1:2013.

Measurement device: model MV2000E available from Alpha Technologies Inc.

Rotational speed of rotor: 2 rpm

Measurement temperature: 140° C.

Measurement duration: the sample was pre-heated for one minute, immediately thereafter the rotor was initiated, and 20 minutes later, the value was determined.

<Crosslinkability (180° C.)>

With each of the fluoroelastomer compositions produced in the examples and comparative examples, a crosslinking curve at 180° C. was obtained in primary crosslinking (press crosslinking) using a type II curelastometer available from JSR Corp. Based on the change in torque, the minimum viscosity (ML), the maximum viscosity (MH), the induction time (T10), and the optimum crosslinking time (T90) were determined. The results are shown in Table 1.

<Crosslinkability (170° C.)>

With each of the fluoroelastomer compositions produced in the examples and comparative examples, a crosslinking curve at 1.70° C. was obtained in primary crosslinking (press crosslinking) using a rubber process analyzer (model: RPA2000) available from Alpha Technologies Inc. Based on the change in torque, the minimum viscosity (ML), the maximum viscosity (MH), the induction time (T10), and the optimum crosslinking time (T90) were determined. The results are shown in Table 1.

<Sheet moldability>

In press-crosslink-molding of each of the non-crosslinked fluoroelastomer sheets in the examples and comparative examples, the capability of the crosslinked sheet to be molded and generation of bubbles were examined. The results are shown in Table 1.

<Normal-State Physical Properties (Tensile Strength and Elongation at Break)>

With each of the crosslinked sheets produced in the examples and comparative examples, the tensile strength (Tb) and the elongation at break (Eb) were determined at a test speed of 500 mm/min and a test temperature of 23° C., in the form of a dumbbell No. 6, using Tensilon RTG-1310 available from A&D Co., Ltd. in conformity with JIS K6251:2010. The results are shown in Table 1.

<Normal-State Physical Properties (Hardness)>

Three identical 2-mm-thick crosslinked sheets produced in the examples and comparative examples were stacked, and the hardness was determined using a type-A durometer in conformity with JIS K6253-3:2012 (peak value and 3 seconds later). The results are shown in Table 1.

<Heat-Aging Resistance>

With each of the crosslinked sheets produced in the examples and comparative examples, a sample in the form of a dumbbell. No. 6 was produced. The sample was heat-treated at 250° C.×72 hours, and then the tensile strength, the elongation at break, and the hardness (peak) were determined in the same manner as mentioned above. Table 1 shows the percent changes based on the measured values of the normal-state physical properties for the tensile strength and the elongation at break, and shows the difference from the measured value of the normal-state physical properties for the hardness.

TABLE 1

| | | | Example 1 | Example 2 | Example 3 | Example 4 | Example 5 | Comparative Example 1 |
|---|---|---|---|---|---|---|---|---|
| Compositon (parts by mass) | Fluorine-containing elastomer 1 | | 100 | 100 | | 100 | | 100 |
| | Fluorine-containing elastomer 2 | | | | 100 | | | |
| | Fluorine-containing elastomer 3 | | | | | | | |
| | Fluorine-containing elastomer 4 | | | | | | | |
| | Fluorine-containing elastomer 5 | | | | | | 100 | |
| | Carbon | | 20 | 20 | 20 | 20 | 20 | 20 |
| | Co-crosslinking agent 1 | | 6.7 | | | | 6.7 | 6.7 |
| | Co-crosslinking agent 2 | | | 4 | 4 | 4 | | |
| | Organic peroxide 1 | | 3 | 3 | 1.5 | | 3 | |
| | Organic peroxide 2 | | | | | | | 3 |
| | Organic peroxide 3 | | | | | | | |
| | Organic peroxide 4 | | | | | 2.5 | | |
| Crosslinkability (180° C.) | ML | N | 5.1 | 4.1 | 3.2 | — | — | 5.2 |
| | MH | N | 46.0 | 24.3 | 17.7 | — | — | 16.1 |
| | T10 | min | 0.3 | 0.2 | 0.4 | — | — | 0.2 |
| | T90 | min | 0.8 | 0.9 | 1.0 | — | — | 1.0 |
| Crosslinkability (170° C.) | ML | dNm | 2.8 | 2.6 | — | 2.5 | 2.6 | 2.8 |
| | MH | dNm | 9.7 | 7.9 | — | 6.2 | 10.5 | 6.3 |
| | T10 | min | 0.6 | 0.6 | — | 0.6 | 0.6 | 0.6 |
| | T90 | min | 2.2 | 2.0 | — | 2.2 | 1.7 | 1.9 |
| Sheet moldability | | | Molded | Molded | Molded | Molded | Molded | Not molded due to bubbles |
| Normal-state physical properties | Tensile strength | MPa | 17.3 | 16.3 | 11.3 | 14.2 | 18.0 | — |
| | Elongation at break | % | 440 | 630 | 710 | 740 | 400 | — |
| | Hardness (peak) | point | 68 | 66 | 64 | 66 | 68 | — |
| | Hardness (3 sec later) | point | 63 | 61 | 57 | 60 | 64 | — |
| Heat-aging resistance | Percent change of tensile strength | % | −20 | −27 | −32 | −32 | −30 | — |
| | Percent change of elongation at break | % | 8 | −9 | 0 | −1 | 10 | — |
| | Change of hardness (peak) | point | 1 | −1 | −1 | −1 | −1 | — |

| | | Comparative Example 2 | Comparative Example 3 | Comparative Example 4 | Comparative Example 5 |
|---|---|---|---|---|---|
| Compositon (parts by mass) | Fluorine-containing elastomer 1 | | | 100 | |
| | Fluorine-containing elastomer 2 | 100 | | | |
| | Fluorine-containing elastomer 3 | | 100 | | |
| | Fluorine-containing elastomer 4 | | | | 100 |
| | Fluorine-containing elastomer 5 | | | | |

TABLE 1-continued

|  |  |  |  |  |  |  |
|---|---|---|---|---|---|---|
|  | Carbon |  | 20 | 20 | 20 | 20 |
|  | Co-crosslinking agent 1 |  | 6.7 | 6.7 |  |  |
|  | Co-crosslinking agent 2 |  |  |  | 4 | 4 |
|  | Organic peroxide 1 |  |  | 3 |  |  |
|  | Organic peroxide 2 |  | 3 |  |  |  |
|  | Organic peroxide 3 |  |  |  | 2 | 2 |
|  | Organic peroxide 4 |  |  |  |  |  |
| Crosslinkability (180° C.) | ML | N | 3.0 | 2.8 | — | — |
|  | MH | N | 13.0 | 48.0 | — | — |
|  | T10 | min | 0.7 | 0.2 | — | — |
|  | T90 | min | 2.0 | 0.7 | — | — |
| Crosslinkability (170° C.) | ML | dNm | — | 0.8 | 0.3 | 1.8 |
|  | MH | dNm | — | 19.1 | 0.3 | 1.9 |
|  | T10 | min | — | 0.5 | 0.8 | 1.2 |
|  | T90 | min | — | 0.9 | 8.3 | 12.1 |
| Sheet moldability |  |  | Not molded due to bubbles | Molded | Not molded due to bubbles | Not molded due to bubbles |
| Normal-state physical properties | Tensile strength | MPa | — | 23.0 | — | — |
|  | Elongation at break | % | — | 290 | — | — |
|  | Hardness (peak) | point | — | 69 | — | — |
|  | Hardness (3 sec later) | point | — | 65 | — | — |
| Heat-aging resistance | Percent change of tensile strength | % | — | −37 | — | — |
|  | Percent change of elongation at break | % | — | 19 | — | — |
|  | Change of hardness (peak) | point | — | 0 | — | — |

INDUSTRIAL APPLICABILITY

A molded article obtainable from the fluoroelastomer composition of the invention is inexpensive and has excellent heat-aging resistance, and thus can be used for a variety of parts in fields such as the automotive industry, the aircraft industry, and the semiconductor industry.

The invention claimed is:

1. A peroxide-crosslinkable fluoroelastomer composition comprising:
a fluorine-containing elastomer that contains 25 to 90 mol % of a unit of vinylidene fluoride, 10 to 75 mol % of a unit of a fluorine-containing monomer other than the vinylidene fluoride, 0 to 10 mol % of a unit of a fluorine-free monomer copolymerizable with the vinylidene fluoride, and 0.1% by mass or less of an iodine atom and a bromine atom;
an organic peroxide containing a partial structure represented by the following formula (1):

(Chem. 1)

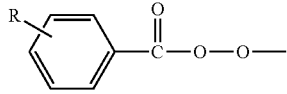

wherein R is H or a $C_1$-$C_4$ alkyl group; and
a co-crosslinking agent,
the organic peroxide being present in an amount of 0.3 to 10 parts by mass relative to 100 parts by mass of the fluorine-containing elastomer,
wherein a metal oxide and a metal hydroxide are present in an amount of 0 parts by mass or more and not more than 0.5 parts by mass relative to 100 parts by mass of the fluorine-containing elastomer.

2. The fluoroelastomer composition according to claim 1, wherein the fluorine-containing elastomer has a Mooney viscosity ML1+10 of 65 or higher at 121° C.

3. The fluoroelastomer composition according to claim 1, wherein the fluorine-containing elastomer comprises vinylidene fluoride, hexafluoropropylene, and a different fluorine-containing monomer, and a unit of the vinylidene fluoride, a unit of the hexafluoropropylene, and a unit of the different fluorine-containing monomer give a mole ratio (vinylidene fluoride unit/hexafluoropropylene unit/different fluorine-containing monomer unit) of (25 to 90)/(10 to 40)/(0 to 50).

4. The fluoroelastomer composition according to claim 1, wherein the fluorine-containing elastomer consists only of vinylidene fluoride and hexafluoropropylene, and a unit of the vinylidene fluoride and a unit of the hexafluoropropylene give a mole ratio (vinylidene fluoride unit/hexafluoropropylene unit) of (25 to 90)/(75 to 10).

5. The fluoroelastomer composition according to claim 1, wherein the fluorine-containing elastomer has a glass transition temperature of 25° C. or lower.

6. The fluoroelastomer composition according to claim 1, wherein the co-crosslinking agent is present in an amount of 0.3 to 10 parts by mass relative to 100 parts by mass of the fluorine-containing elastomer.

7. The fluoroelastomer composition according to claim 1, wherein the organic peroxide is t-butyl peroxybenzoate or 2,5-dimethyl-2,5-di(benzoylperoxy)hexane.

8. A molded article obtained by crosslinking the fluoroelastomer composition according to claim 1.

* * * * *